Dec. 28, 1965    S. POWELL    3,225,485
ANIMAL TRAP

Filed May 25, 1964    2 Sheets-Sheet 1

INVENTOR.
STANLEY POWELL,

BY Yungblut, Melville, Strasser & Foster
ATTORNEYS.

Dec. 28, 1965 S. POWELL 3,225,485
ANIMAL TRAP
Filed May 25, 1964 2 Sheets-Sheet 2
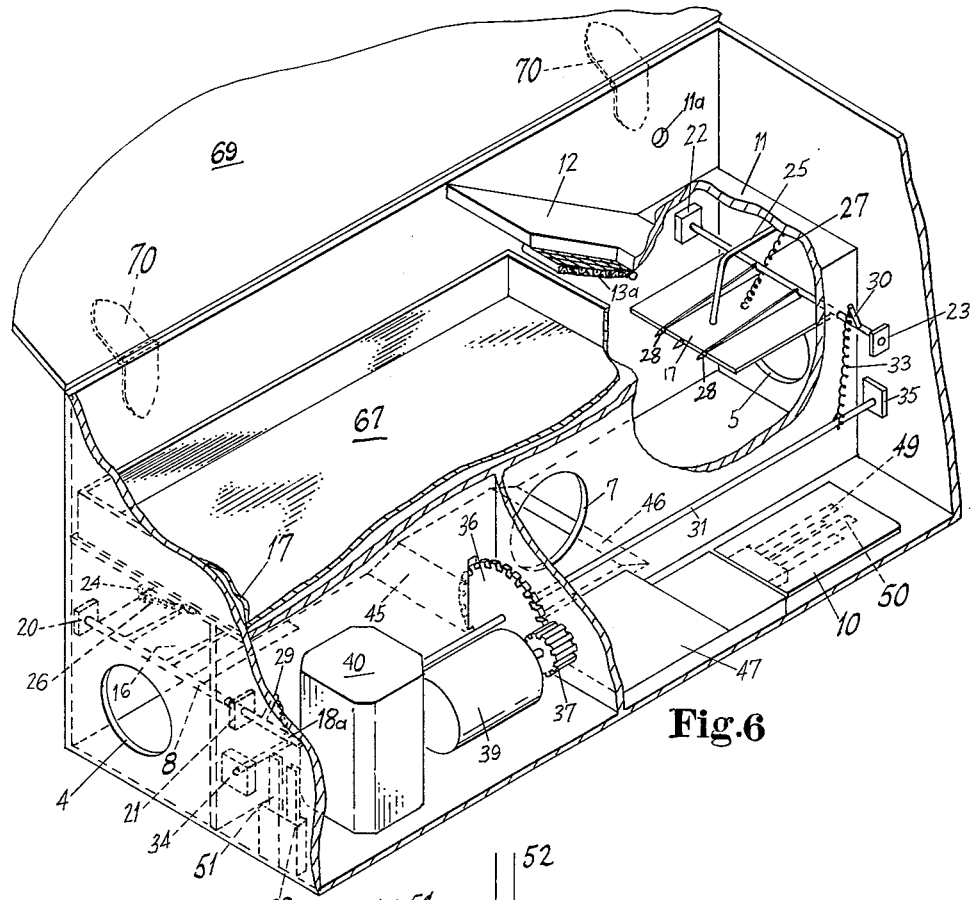
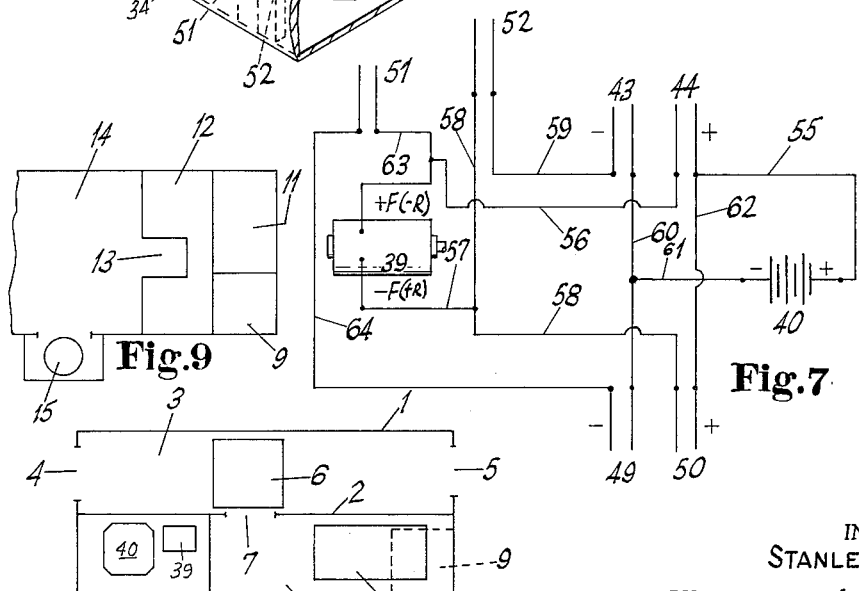
INVENTOR.
STANLEY POWELL,
ATTORNEYS.

United States Patent Office 3,225,485
Patented Dec. 28, 1965

3,225,485
ANIMAL TRAP
Stanley Powell, Franklin, Ohio, assignor of one-third each to Robert S. Sutton and Jeff D. Howard
Filed May 25, 1964, Ser. No. 369,899
12 Claims. (Cl. 43—67)

This invention relates to animal traps and has to do more particularly with a trap suited to the needs of exterminators for the mass extermination of rodents and similar pests. While in the description which follows the invention will be described in terms of a rodent trap, it will be understood from the outset that the device will find utility for trapping diverse small animals, birds, and the like.

Extreme caution must be exercised by an exterminator in the use of poisonous materials due to the possibility that domestic animals, song birds and even humans might come into contact with the poison. Consequently, the use of poisons is carefully controlled and regulated. For example, in rodent traps which utilize poison, it is required that the opening leading to the poison be of a specified size, such as not greater than 2½" x 2½". Experience has shown that a rodent is not likely to enter an opening of this size unless forced to do so; and consequently the trap becomes relatively ineffective for its intended purpose. A rodent will, however, enter a larger size opening; but as already indicated, a poison may not be used in a trap wherein the poison is accessible through such larger opening.

In accordance with the instant invention, the aforementioned difficulties are overcome by providing a multiple compartment trap having an outer compartment provided with relatively large access openings which a rodent will readily enter, means being provided within the outer compartment to close the access openings upon the entry of a rodent therein, whereupon the trapped rodent is forced to enter one or more additional compartments one of which may contain poison and to which access may be had only through an opening of a size which will meet regulations relative to the use of poisons in traps.

It is thus a principal object of the instant invention to provide a multiple compartment trap of the character described wherein the access opening or openings are adapted to be closed by movable doors which are automatically moved from the opened to the closed position upon the entry of a rodent into the outer compartment.

A further object of the invention is the provision of a trap of the character described wherein the outer compartment connects with a passageway or second compartment which in turn may connect with a third compartment and wherein a door actuating means is provided lying beyond the outer compartment and operative upon passage of the rodent beyond the outer compartment to reopen the doors and hence permit the entry of additional rodents into the outer chamber.

Yet another object of the instant invention is the provision of electrically operated doors in the outer compartment, which doors are opened and closed by means of switches operatively connected to treadles which are responsive to the weight of a rodent standing thereon.

Yet a further object of the invention is the provision of a battery operated motor for opening and closing the doors in response to the opening and closing of the switches, the circuit including door-actuated circuit breakers for opening the circuit in the event a rodent should remain on one of the treadles for any appreciable length of time, thereby preserving the strength of the battery.

Still a further object of the invention is the provision of a trap of the character described where, in a preferred embodiment, the access opening to the compartment in which poison is to be placed is closed by a spring-biased one-way door so that once a rodent has entered the poison containing compartment, it cannot thereafter return to the compartments and/or passageways through which it had already traveled. It is contemplated, however, that the poison containing compartment will be provided with an exit through which the rodents may leave the trap or else be collected in a suitable container. For example, the poison containing compartment may be provided with a shallow flat pan covering the entire floor area of the poison compartment; and consequently the rodent will be forced to walk through the poison as it seeks to find the exit. The poison will, however, cling to the rodent's feet and it is a well known phenomenon that rodents will lick their feet to remove any foreign matter contained thereon, and consequently will consume a lethal dose of the poison. Consequently, where regulations permit, the exit may be simply to the outside so that the rodents may die elsewhere, or where required the exit may be connected to a pit or other container into which the rodents will fall and from which they cannot escape.

The foregoing together with other objects of the invention which will appear hereinafter, or which will be apparent to the skilled worker in the art upon reading this specification, are accomplished by that construction and arrangement of parts of which an exemplary embodiment shall now be described.

Reference is now made to the accompanying drawings wherein:

FIGURE 6 is a perspective view with parts broken away illustrating the various operating components of the invention.

FIGURE 7 is a circuit diagram illustrating the circuit and switch means for actuating the doors.

FIGURE 8 is a schematic plan view of the lower level of the trap illustrating the various openings and compartments therein.

FIGURE 9 is a fragmentary schematic plan view illustrating the various compartments and openings in the upper level of the trap.

Figure 1:
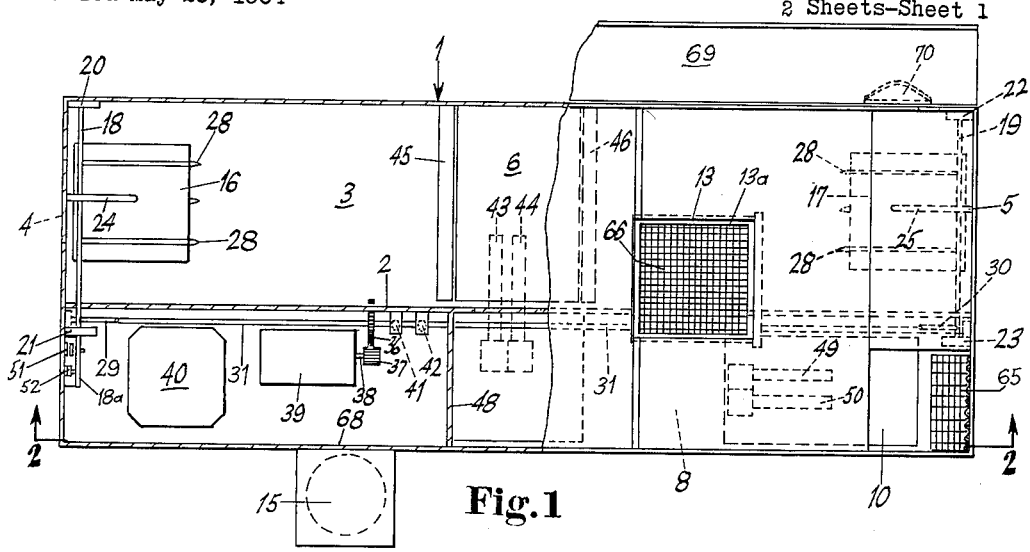
FIGURE 1 is a top plan view of the trap with the lid or cover in the open position but with other parts broken away to show the underlying compartments.

For a general understanding of the invention reference is first made to FIGURE 8 of the drawings wherein the trap is indicated generally by the reference numeral 1, the lower level being divided interiorly by a longitudinally extending wall 2 which defines a first compartment 3 which extends lengthwise along the trap and is provided at its opposite ends with access openings 4 and 5. While only one such access opening may be employed, it is preferred to provide them at opposite ends of the trap so that a passageway may be provided through which the rodent will seek to travel. It is well known that rodents will normally travel along a path which follows the edge of a wall or building, and consequently the trap may be placed along the edge of a wall or building where rodents are known to travel, so that the elongated compartment 3 lies in the rodents' normal path of travel. It has been observed that a rodent will travel through the chamber rather than divert from its normal path of travel so as to avoid the trap. Of course, if desired, bait may be placed in the trap, preferably on the treadle 6 which is positioned centrally between the access openings 4 and 5. As will be explained more fully hereinafter, the treadle overlies switch means for actuating the doors which are arranged to close the access openings 4 and 5; and hence a rodent upon placing its weight on the treadle will cause the doors to close and hence seal off its means of exit from the compartment 3. An opening 7 is, however, provided between the compartment 3 and a second compartment or passageway 8 lying on the opposite side of the longitudinal wall 2. The rodent will eventually enter the compartment 8 seeking a means of escape. Such means of escape comprises an opening at the far end of the passageway 8 which leads upwardly to the upper level of the trap, such opening being indicated in dotted lines at 9 in FIGURE 8 and in solid lines in FIGURE 9. A second treadle 10 is positioned in the compartment 8 underlying the opening 9; and this treadle will be operatively connected to switch means effective to reopen the doors closing the access openings 4 and 5, thereby permitting another rodent to enter the trap. If, however, a rodent in the compartment 8 should seek to return to compartment 3 through opening 7, the treadle 6 will again be contacted as the rodent passes through the opening; and such movement will actuate the switch means underlying treadle 6 and the doors closing openings 4 and 5 will again be closed. Ultimately the rodent will climb upwardly through opening 9 where it will be standing on shelf 11 and upwardly inclined wall 12 which has an opening 13 therein normally closed by a spring-biased door 13a preferably formed of wire mesh. The opening 13 will be of a size to conform to regulations governing the dimensions of an opening leading to poison; and in this connection a pan or tray of poison may be placed in a third compartment 14 which lies beyond the opening 13. The rodent will be aided in finding its way through inner compartments of the trap by light holes in the sides and top of the trap which lie along its path of travel, several such light holes being indicated at 11a in FIGURES 2 and 6. Upon stepping on the door 13a or pushing against it, it will open, whereupon the rodent is admitted to the chamber 14. The door closing the opening 13 is a one-way door in that, once the rodent has passed beyond the door, its spring means will return it to the closed position and it will remain closed. If poison is placed in compartment 14, the rodent will either eat the poison or it will stick to the rodent's feet if it is spread throughout the extent of the compartment 14. The rodent will readily find the exit 15 which, as already indicated, may either lead to the outside or else to a pit or other collection chamber from which the rodent cannot escape. In the event poison is not used in the trap, as where the trap is employed to collect birds or animals for subsequent disposition, the exit will communicate with a suitable collection chamber.

With the foregoing general description in mind, reference is now made to FIGURE 1 of the drawings wherein it will be seen that the access openings 4 and 5 are adapted to be closed by doors 16 and 17 mounted on rods 18 and 19, respectively, the rods being journaled in bearing blocks 20, 21 and 22, 23. Stop arms 24 and 25 overlie the doors and act to establish their fully open position. Springs 26 and 27 (see FIGURES 2 and 6) act to bias the doors to their open position. In addition, it is preferred to provide sets of barbs 28 on the lowermost ends of the doors. Such barbs have been found highly effective in the event a rodent is standing beneath the doors as they are closed, the barbs serving to urge the rodent into the trap.

Figure 2:
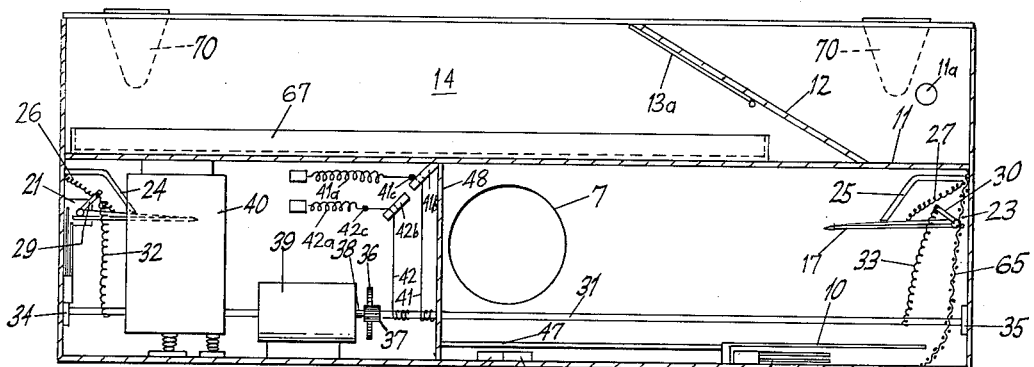
FIGURE 2 is a side elevational view taken along the line 2—2 of FIGURE 1.

The rods 18 and 19 extend thorugh the longitudinal wall 2 where they mount arms 29 and 30 which are operatively connected to actuating shaft 31 by means of fine wire helical springs 32 and 33 which are fixedly secured to the shaft 31 at their lowermost ends. Thus, when the shaft 31 is rotated, the lowermost ends of the springs will wrap around the shaft and in so doing will exert closing force for the doors 16 and 17 which will swing downwardly so as to overlie the access openings 4 and 5. The shaft 31 may be conveniently journaled at its opposite ends in bearing blocks 34 and 35. Gears 36 and 37 operatively connect the actuating shaft 31 to the drive shaft 38 of reversible motor 39 which is powered by dry cell battery 40. It will be evident that when the actuating shaft 31 is rotated in one direction the springs 32 and 33 will be wound about the shaft and hence will move the doors to their closed position. When the shaft is rotated in the opposite direction, the ends of the springs will be unwound and the doors will be free to return to the open position under the influence of springs 26 and 27. To assure positive stoppage of the actuating shaft 31 it has been found desirable to provide flexible wires 41 and 42 connected to the shaft 31 by means of springs 41a and 42a, as seen in FIGURE 2, which serve to maintain the wires taut. The ends of the wires are secured to the shaft and are arranged to be wound on the shaft in opposite directions as the shaft is rotated. That is, as the shaft is rotated in a clockwise direction, the wire 41 will be wound on the shaft, whereas the wire 42 is being unwound. Conversely, when the shaft is rotated in the counterclockwise direction, the wire 42 will be wound on the shaft, whereas the wire 41 will be unwound. A positive stop is provided by the grommets 41b and 42b which have eyelets through which the wires 41 and 42 pass. The wires are provided with stops 41c and 42c, which are larger than the eyelets in the grommets, and the stops are so arranged that they will alternately contact the grommets as the wires are wound and unwound, thereby arresting movement of the shaft when the doors reach either the fully open or fully closed positions. As will be explained more fully hereinafter, the actuating circuit for the motor is so arranged that the direction of rotation of the motor will reverse each time it is energized.

The treadle 6 in compartment 3 is spaced upwardly from the bottom of the compartment so that a pair of normally open switches 43 and 44 underlie the treadle 6, the arrangement being such that when weight is placed on the treadle 6 both of the switches will be closed, whereas when the weight is released the switches will both open. Preferably, the side edges of the elevated treadle will be protected by curb members 45 and 46 which lie just beyond the side edges of the treadle. It is also preferred that the switches 43 and 44 project into compartment 8 where they are covered by a slightly elevated platform 47, which, as seen in FIGURE 2, may extend to treadle 10, such elevated platform providing space beneath which the wiring for the switches may be conveniently placed. In this connection, it will be noted that a wall 48 may be provided to separate the compartment 8 from the area in which the motor 39 and battery 40 are located.

A second set of normally open switches 49 and 50 underlie the treadle 10 and are arranged to be closed when weight is placed on the treadle.

Figures 3, 4, 5:
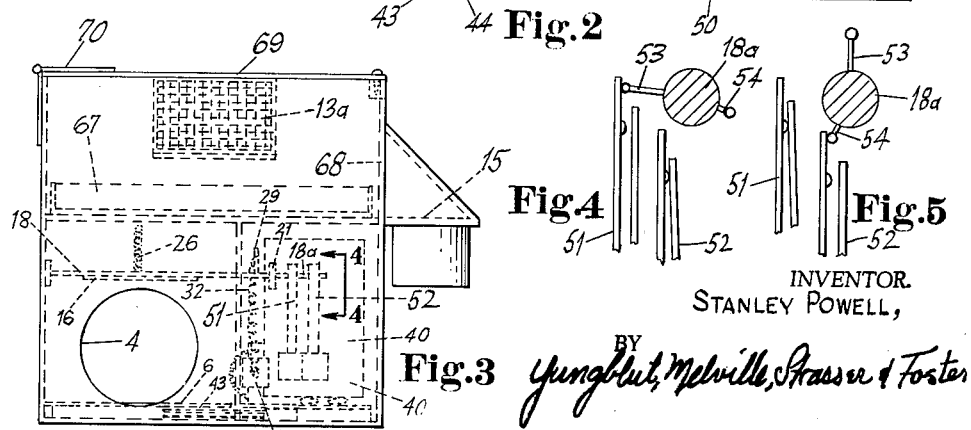
FIGURE 3 is an end elevational view taken from the left-hand end of FIGURE 1.
FIGURE 4 is a fragmentary vertical sectional view taken along the line 4—4 of FIGURE 3.
FIGURE 5 is a fragmentary vertical sectional view similar to FIGURE 4 but showing the parts in an alternate position of use.

As possibly best seen in FIGURES 3 and 6, a set of normally closed switches 51 and 52 are mounted on the end wall of the trap adjacent the rod 18 which controls the movement of door 16; and to this end it will be noted that the rod 18 has an extended end 18a which overlies the free ends of the switches 51 and 52. As can be best seen in FIGURES 4 and 5, the extension 18a of the rod carries a pair of fingers 53 and 54 which, upon rotation of the rod 18 and its extension 18a, act to selectively open the switches 51 (FIGURE 4) and 52 (FIGURE 5) depending upon whether the door 16 is in the closed or the open position. Thus, when the door is in the open position, the switch 51 will be held open by the arm 53 and the arm 54 will be free from contact with the switch 52 and it will remain closed. However, when the shaft 18 and its extension 18a are rotated so as to bring the door 16 to the closed position, the fingers 53 and 54 will be rotated to the position shown in FIGURE 5 wherein the finger 53 is free from contact with switch 51 and the switch closes, whereas the arm 54 contacts the switch 52 and opens it.

Referring now to the wiring diagram of FIGURE 7, it will be seen that when the switches 43 and 44 are closed, a circuit will be formed from the positive side of battery 40 through lead 55, switch 44 and lead 56 connected to one side of the reversible motor 39. The opposite side of the motor is connected through leads 57 and 58 to normally closed switch 52 which in turn connects through lead 59 to closed switch 43 connected by leads 60 and 61 to the negative side of the battery. It will be remembered, however, that when the door moves from the open to closed position, the normally closed switch 52 will be opened by the finger 54, thereby breaking the circuit to the motor even though the switches 43 and 44 remain closed. Even if the switches 43 and 44 are opened and reclosed, the circuit to the motor remains broken due to open switch 52, and consequently the motor will not be reenergized. If, however, the pair of switches 49 and 50 are now closed— which takes place when the treadle 10 is depressed—the positive side of the battery will be connected through lead lines 55 and 62 to closed switch 50, and thence through leads 58 and 57 to the side of the motor opposite that which was connected to the positive side of the battery when the switches 43 and 44 were closed, thereby effecting the necessary reversal in the direction of the motor. The remaining side of the motor is connected through lead 63 to now closed switch 51 and thence through lead 64 to closed switch 49 for return to the negative side of the battery through leads 60 and 61. Energization of the motor will, in this instance, cause the doors to move from the closed to the opened position, which movement acts, through finger 53, to reopen switch 51 and hence break the motor circuit. The opening of either of the switches 51 or 52 serves to prevent the drain of current from the battery in the event the sets of switches 43, 44 and 49, 50 were to remain closed for any appreciable time, as where the rodent might remain stationary on the overlying treadle.

Referring again to FIGURES 1 and 2, it will be noted that a wire mesh ladder 65 extends upwardly from the remote end of treadle 10 to the opening 9 to facilitate the rodents climbing onto platform 11. Once on the platform 11 and/or slanting wall 12, the rodent has ready access to the spring-biased one-way door 13a which closes opening 13. It is preferred that the door be constructed of wire mesh, as indicated at 66 in FIGURE 1, so that the scent of bait placed in compartment 14 will permeate the door and hence induce the rodent to enter the poison containing compartment. A poison pan 67 is preferably placed in the compartment 14 so that the rodent will be forced to walk through the poison as it seeks egress through opening 68 which leads to exit opening 15. The bait pan 67 may be conveniently filled and replenished as required through the hinged cover 69 secured to the trap by means of hinges 70. The outlet opening 15 may serve either to release the now poisoned contaminated rodent or it may be connected to a collection pit or other container from which the rodent cannot escape.

Preferably, the side wall of the trap facing the compartment 8 will be removable so that access may be had to the battery and motor, although a separate door may be provided in the wall for access to the battery and motor, if so desired. It is also preferred that the platform defining the floor of compartment 14 and shelf 11 be removable, thereby permitting access to the compartment 3 for cleaning purposes or repair of the door mechanisms.

Modifications may, of course, be made in the invention without departing from its spirit and purpose. For example, the door actuating mechanism is exemplary only, and it will be evident that the several compartments may be arranged on a single level, although the two-level arrangement employed has been found to be highly satisfactory. It is also within the spirit of the invention to provide an essentially two compartment trap wherein the opening between the first and second compartments comprises a one-way door, with a suitable exit provided in the second compartment at a point remote from the door. It will also be understood that the utility of the invention is not limited to a rodent trap, but rather may be employed for trapping diverse kinds of small animals, birds and the like. For example, it has been found that the trap is highly useful in exterminating pest birds, such as starlings, the trap being placed on top of a chimney with the exit opening 15 connected to an unused flue. Upon being suitably baited, the birds will enter the trap and will ultimately work their way to the exit opening from which they will fall into the flue for subsequent removal from the clean-out at the bottom of the flue. Obviously, the size of the trap may be varied in accordance with the size of the animals to be trapped.

The embodiments of the invention in which an exclusive property or privilege is claimed are defined as follows:

1. In an animal trap having a body defining an enclosure, partition means within said enclosure dividing it into a plurality of compartments, a first of said compartments comprising an entrance compartment having an access opening therein, a door mounted for opening and closing movement relative to said access opening, driving means for moving said door from one position to the other, said driving means including a reversible electric motor, a second compartment within said enclosure adjoining said first compartment, an opening between said first and second compartments at a point remote from said access opening, treadle means adjacent the opening between said first and second compartments positioned to be contacted by an animal moving between said first and second compartments, said treadle means including a first switch means and a circuit between said first switch means and said motor operative to energize said motor so as to move said door from the open to the closed position when said treadle is contacted by an animal, and a second treadle means within said second compartment, said second treadle means including a second switch means and a circuit between said second switch means and said motor operative, when actuated, to energize said motor in the reverse direction and thereby reopen said door.

2. The animal trap claimed in claim 1 including cam actuated switch means operatively connected to said door for selectively breaking the said circuits between said motor and said first and second switch means.

3. In an animal trap having a body defining an elongated essentially rectangular enclosure, a partition extending lengthwise within said enclosure and dividing it into a plurality of compartments, a first of said compartments comprising an entrance compartment extending the full length of said trap and having an access opening at each end thereof, a door mounted for opening and closing movement relative to each of said access openings, driving means for moving said doors from one position to the other, a second compartment within said enclosure on the opposite side of said partition, an opening in said partition interconnecting said first and second compartments centrally of said first compartment, a treadle in said first compartment in alignment with the opening between said first and second compartments, said treadle including switch means operatively connected to said door driving means, a third compartment within said enclosure in communication with said second compartment, said third compartment being separated from said second compartment by a wall having an opening therein normally closed by a displaceable closure means, a second treadle in said second compartment, and switch means operatively connected to said second treadle and to the driving means for opening and closing said doors, said driving means including a reversible electric motor having a forward circuit operatively connected to the switch means associated with said first named treadle and a reverse circuit operatively connected to the switch means associated with said second treadle.

4. The animal trap claimed in claim 3 including additional switch means in both the forward and reverse circuits for said electric motor, and cam means operatively connected to at least one of said doors for selectively actuating said last named switch means upon opening and closing movement of said doors.

5. The animal trap claimed in claim 4 wherein said doors are spring-biased to the open position, and wherein said driving means acts to move said doors to the closed position against the tension of said springs.

6. The animal trap claimed in claim 4 wherein said third compartment overlies said first compartment and a part at least of said second compartment, wherein said second compartment has an opening therein overlying said second treadle for communication with the wall separating said second and third compartments, and wherein said last named wall is diagonally disposed in the direction of said third compartment.

7. The animal trap claimed in claim 6 wherein the displaceable closure member for the opening in the wall between said second and third compartments comprises a normally closed spring loaded door displaceable only in the direction of said third compartment.

8. The animal trap claimed in claim 7 including an exit opening in said third compartment at a point remote from the opening between said second and third compartments, and a poison containing receptacle in said third compartment of a size to substantially cover the floor area of said third compartment.

9. The animal trap claimed in claim 8 including a displaceable cover overlying and closing said third compartment.

10. The animal trap claimed in claim 1 wherein said first compartment has a plurality of access openings and a door associated with each of said access openings, and wherein each of said doors is operatively connected to the driving means for opening and closing said doors.

11. The animal trap claimed in claim 1 wherein a one-way exit from said second compartment is positioned beyond said second treadle so that an animal will contact said second treadle before leaving by said exit.

12. The animal trap claimed in claim 11 wherein a container for collecting animals is secured to said exit on the side thereof opposite said second compartment.

References Cited by the Examiner

UNITED STATES PATENTS

| | | | |
|---|---|---|---|
| 1,061,477 | 5/1913 | Hildreth | 43—76 |
| 2,587,397 | 2/1952 | Smith | 43—131 |
| 3,075,316 | 1/1963 | Primentel | 43—99 X |

SAMUEL KOREN, *Primary Examiner.*

WARNER H. CAMP, *Assistant Examiner.*